United States Patent [19]
Clark et al.

[11] Patent Number: 5,853,846
[45] Date of Patent: Dec. 29, 1998

[54] CONFORMABLE MAGNETIC ARTICLES UNDERLAID BENEATH TRAFFIC-BEARING SURFACES

[75] Inventors: Gary W. Clark, Lakeville; Thomas J. Dahlin, St. Louis Park; Richard E. Fayling, White Bear Lake; Bernard A. Gonzalez, St. Paul; David M. Hopstock, Roseville; Gregory F. Jacobs, Woodbury; Robert L. Keech, White Bear Lake, all of Minn.

[73] Assignee: Minnesota Mining and Manufacturing Company, St. Paul, Minn.

[21] Appl. No.: 732,795

[22] Filed: Oct. 15, 1996

Related U.S. Application Data

[60] Provisional application No. 60/005,551 Oct. 18, 1995.

[51] Int. Cl.$^6$ .............................. E01F 11/00; B32B 3/24
[52] U.S. Cl. ........................... 428/131; 428/40; 428/343; 428/900; 428/143; 428/149; 428/156; 428/325; 428/692; 428/694 R; 428/694 B; 428/694 BC; 428/694 BV; 404/6; 404/9; 404/14; 404/16; 404/71; 340/901; 340/905; 180/167; 180/168; 701/23
[58] Field of Search ............................. 428/131, 40, 343, 428/900, 143, 149, 156, 325, 692, 694 R, 694 B, 694 BC, 694 BU; 404/6, 9, 14, 16, 71; 340/901, 905; 180/167, 168; 701/23

[56] References Cited

U.S. PATENT DOCUMENTS

| | | | |
|---|---|---|---|
| 1,803,288 | 4/1931 | Adler, Jr. | 180/167 |
| 1,803,289 | 4/1931 | Adler, Jr. | 180/167 |
| 1,803,290 | 4/1931 | Adler, Jr. | 180/167 |
| 1,803,291 | 4/1931 | Adler, Jr. | 180/167 |
| 1,803,292 | 4/1931 | Adler, Jr. | 340/905 |
| 1,886,720 | 11/1932 | O'Brien | 404/71 |
| 2,634,659 | 4/1953 | Jordanoff | 404/71 |
| 2,999,275 | 9/1961 | Blume, Jr. | 18/55 |
| 3,179,918 | 4/1965 | Hoeppel | 340/32 |
| 3,359,152 | 12/1967 | Blume, Jr. | 161/162 |
| 3,493,923 | 2/1970 | Steven et al. | 340/32 |
| 3,575,255 | 4/1971 | Wickstrom | 180/98 |
| 3,609,678 | 9/1971 | Fayling | 340/32 |
| 3,642,087 | 2/1972 | Sampey | 180/98 |
| 3,668,624 | 6/1972 | Spaulding | 340/32 |
| 3,714,625 | 1/1973 | Fayling | 340/32 |
| 3,753,223 | 8/1973 | Fayling | 340/32 |
| 3,787,839 | 1/1974 | Fayling | 340/381 R |

(List continued on next page.)

FOREIGN PATENT DOCUMENTS

| | | | |
|---|---|---|---|
| 0 135 740 | 4/1985 | European Pat. Off. | G08G 1/09 |
| 0 184 543 | 6/1986 | European Pat. Off. | C08K 3/02 |
| 0 346 021 | 12/1989 | European Pat. Off. | E01F 9/08 |
| 0 418 807 A2 | 3/1991 | European Pat. Off. | H01F 1/117 |
| 43 42 319 A1 | 6/1995 | Germany | E01F 15/00 |

OTHER PUBLICATIONS

Magnetic Marker Using Ferrite–Byproduct and Its Application by Yamauchi andNakano, Ferrites: Proceedings of the International Conference, Sep.–Oct. 1980, Japan pp. 894–897.

Jacobs, G.F. et al., "A Magnetic Pavement Marking and Sensor System for Lateral Control/Guidance of Vehicles," Proceedings of the World Congress on Intelligent Transport Systems, vol. 3, Yokahama, Japan pp. 1236–1241 (1995).

Primary Examiner—William P. Watkins, III
Attorney, Agent, or Firm—Lisa M. Fagan; Peter L. Olson

[57] ABSTRACT

A conformable magnetic article for underlayment beneath a traffic-bearing surface which sends a magnetic signal to a sensor traveling over the traffic-bearing structure. The magnetic article comprises at least one conformable magnetic layer comprising a binder and a sufficient amount of magnetic particles dispersed within the binder to provide a magnetic signal through the traffic-bearing structure to a sensor.

16 Claims, 4 Drawing Sheets

U.S. PATENT DOCUMENTS

| | | | |
|---|---|---|---|
| 3,878,367 | 4/1975 | Fayling et al. | 235/61.12 M |
| 3,927,393 | 12/1975 | Fayling | 340/149 A |
| 4,069,281 | 1/1978 | Eigenmann | 264/1 |
| 4,090,662 | 5/1978 | Fayling | 235/493 |
| 4,117,192 | 9/1978 | Jorgensen | 428/337 |
| 4,185,265 | 1/1980 | Griffin et al. | 340/32 |
| 4,219,092 | 8/1980 | Richler | 180/169 |
| 4,234,264 | 11/1980 | Baldi | 404/11 |
| 4,239,415 | 12/1980 | Blikken | 404/71 |
| 4,248,932 | 2/1981 | Tung et al. | 428/325 |
| 4,299,874 | 11/1981 | Jones et al. | 428/143 |
| 4,312,601 | 1/1982 | Allen | 404/71 |
| 4,388,359 | 6/1983 | Ethan et al. | 428/143 |
| 4,490,432 | 12/1984 | Jordan | 428/220 |
| 4,497,722 | 2/1985 | Tsuchida et al. | 252/62.54 |
| 4,534,673 | 8/1985 | May | 404/14 |
| 4,988,541 | 1/1991 | Hedblom | 427/163 |
| 4,988,555 | 1/1991 | Hedblom | 428/172 |
| 5,039,979 | 8/1991 | McClive | 340/438 |
| 5,082,715 | 1/1992 | Lasch et al. | 428/143 |
| 5,120,154 | 6/1992 | Lasch et al. | 404/14 |
| 5,127,973 | 7/1992 | Sengupta et al. | 156/60 |
| 5,189,612 | 2/1993 | Lemercier et al. | 364/424.02 |
| 5,194,113 | 3/1993 | Lasch et al. | 156/243 |
| 5,227,221 | 7/1993 | Hedblom | 428/172 |
| 5,316,406 | 5/1994 | Wyckoff | 404/12 |
| 5,347,456 | 9/1994 | Zhang et al. | 364/424.02 |

ABSTRACT# CONFORMABLE MAGNETIC ARTICLES UNDERLAID BENEATH TRAFFIC-BEARING SURFACES

CROSS-REFERENCE TO RELATED APPLICATION

This application claims priority to U.S. Provisional Ser. No. 60/005551, filed Oct. 18, 1995.

1. Field of the Invention

The present invention relates to the field of magnetic articles, in particular, to articles which may be underlaid beneath a traffic-bearing surface such as a roadway, warehouse floor, and the like, to guide a vehicle or other mobile object thereon.

2. Background of the Invention

Safer, more efficient and more accessible transit for citizens is a high priority for many governments. Public service workers, public transit vehicles and emergency vehicles must have the capability to move more rapidly and safely on roadways in a variety of weather conditions.

Inclement weather and even blinding sunlight or oncoming traffic light present special problems both for existing travel systems and for guidance systems that offer lateral vehicle control. An unfortunate number of tragic accidents have occurred due to people driving under the influence of alcohol and over-the-counter medicines. Snowy conditions, fog, heavy rain, blowing dust and smoke are examples of challenges to vehicle drivers. Snowy weather presents particularly challenging driving conditions to snowplow drivers trying to clear lanes in blowing snow or when lane markers are obstructed by snow. Furthermore, reduced visibility brought by blowing snow has caused numerous tragic accidents when automobile drivers have rear-ended snowplows traveling slower than surrounding traffic. Winter weather will continue to challenge any intelligent transportation system (ITS) in which vehicles move at faster speeds and closer together on more crowded roadways. A magnetic, lateral guidance system addresses the special needs of drivers who cannot, for whatever reason, see the road.

In addition to vehicles, other mobile objects such as farm animals, pets, fire fighters, visually impaired pedestrians, and the like may also benefit from control and/or guidance systems. Mobile robots equipped with magnetic sensors may be guided and/or controlled as they move on their path, for example, along an industrial assembly line. Perimeter and boundary awareness systems are needed in specific instances. Two examples include warnings of hazardous conditions in the environment and pet containment systems. Games frequently require defined boundaries, such as foul territory in baseball and out of bounds in soccer, and it is frequently desired that toys and sporting equipment emit audible signals when crossing a designated line.

Several alternative methods for sensing the lateral position of a vehicle on a roadway are known. One option involves the use of visible signs or markings and optical sensors. However, a system which relies on optical sensors may have reliability problems. The signs or markings can be obscured by dirt, ice, or snow, and visibility can be impaired by fog, blowing snow, blowing dust, and the like. Furthermore, for night usage, a considerable amount of energy is expended, either to illuminate the signs or to emit a beam from the sensor.

Another approach is the use of radar reflective markers with a radar ranging system on the vehicle. Both the markers and the radar detection systems are expensive in comparison with the magnetic system proposed herein. In addition, metallic radar reflective markers embedded in the roadway are likely to have durability and corrosion problems.

A magnetic system offers several advantages:

it is not adversely affected by weather conditions;

it does not require expensive video or other radio frequency equipment;

the system's operating costs remain low since the marker is passive; no power is required to make a magnetic marker function; and the system's durability means that, once installed, a magnetic marker will likely last the life of the roadway (typical roadways have life spans of six to eight years) and may even be reprogrammed while still a part of the roadway.

Known magnetic marking systems include using a series of magnetic "nails" embedded in the roadway. Because the field strength decreases as the cube of the distance from such a dipolar magnetic field source, the "nails" would have to be fairly closely spaced to produce a useful signal. Material costs would be high if the most powerful rare earth magnets were used to minimize the size and maximize the spacing. Boring holes in the roadway and using rigid nails may also lead to stress concentration and premature pavement failure, which may be exacerbated by corrosion of nails. The use of simple ferrous metal spikes would not provide the alternating signal desirable for effectively separating the position signal from noise.

Another magnetic marking system employs a magnetic paint to produce magnetic stripes on the roadway. The paint stripe can be magnetized only after it had dried. With the typical thickness of paint layers, a sufficiently strong magnetic signal is difficult to obtain. However, if the thickness of the paint is built up to obtain a good magnetic signal, the paint durability would be poor. A specially designed magnetizing fixture would have to be driven along the strip. Because of limitations in the magnetic field produced by such a fixture, the coercivity of the magnetic material would likely be limited to about 1000 oersteds, making it susceptible to erasure, and anything other than a longitudinal magnetization pattern would be difficult to produce.

Magnetic guidance systems of the prior art have been embedded within a roadway. One such system is disclosed in U.S. Pat. No. 3,609,678. The polymer-based magnetic materials disclosed are resilient and flexible, such as nitrile and silicone rubber, and plasticized PVC. Resilient refers to recovering to substantially the original shape after removal of a deformation force. The '678 patent discloses, in one embodiment, a polymeric magnetic tape or sheet that is "either inserted edgewise in a narrow channel or slot or laid flat in a more shallow channel cut in the roadway." (col. 3, lines 4–6). This patent further states that magnets may also be embedded within the pavement of the roadway instead of in an open channel. (col. 3, lines 31–32). A flux sensor is mounted on a vehicle that travels over the roadway, and the sensor can generate an electric signal in response to the magnetic medium if the magnetic field is sufficiently strong to be sensed. The '678 patent discloses that the intensity of the magnetic field at the surface of the roadway should be at least 2 gauss, preferably at least 10 gauss, and more preferably at least 100 gauss, to provide a strong signal even when road conditions are less than optimal. (col. 4, line 75 through col. 5, line 6).

Although it has its own utility, the system disclosed in the '678 patent may not be desirable because it relates specifically to embedding a magnetic medium in an existing road.

That is, this patent discloses cutting a slot, hole, or other aperture in an existing road, inserting a magnet or plurality of magnets in a resilient material within the aperture, and then sealing the aperture to protect the magnets.

Conventional conformable non-magnetic pavement marking sheet materials are known in the art and typically comprise a polymeric material, such as one that could be crosslinked to form an elastomer, but which is not crosslinked in the sheet material and thereby provides desired viscoelastic properties. Conformable refers to being capable of being deformed under a loading force and retaining a substantial part of that deformation after removal of a loading force. Illustrative examples of conformable non-magnetic pavement markings include U.S. Pat. No. 4,490,432, U.S. Pat. No. 5,316,406, U.S. Pat. No. 4,069,281, and U.S. Pat. No. 5,194,113.

None of the above disclosures describe the use of magnetic particles in a conformance layer or underlaying a conformable magnetic article beneath a traffic-bearing surface.

SUMMARY OF THE INVENTION

The conformable magnetic articles of the present invention are underlaid beneath a traffic-bearing surface and are used as a part of an underlaid magnetic guidance system. The guidance system is defined herein as providing information to a vehicle driver or to another mobile object or system and/or controlling a vehicle or mobile object. The magnetic article may be either "retrofitted" to the traffic-bearing structure, meaning that the article is underlaid beneath an existing traffic-bearing structure, or installed concurrently with the traffic-bearing surface. Thus, the magnetic article is much less susceptible to damage by vehicular traffic traveling over the magnetic article, and in particular cannot be damaged or peeled away from the surface by the blade of a snow plow.

Often when a traffic-bearing structure is being resurfaced, the pavement markings already present on the surface are removed prior to resurfacing. The pavement markings are removed in order to prevent reflection cracking of the pavement around the buried shape of the marking beneath it. This cracking is likely caused by the mismatch of thermodynamic and mechanical properties between the traffic-bearing structure material and the buried pavement marking. Traffic driving over these traffic-bearing surfaces often accelerated this cracking. Surprisingly, the traffic-bearing structures exhibit no premature cracks or damage where the articles of the present invention are underlaid.

The present invention provides a conformable magnetic article for underlayment beneath a traffic-bearing surface which sends a magnetic signal to a sensor traveling over the traffic-bearing structure. The magnetic article comprises at least one conformable magnetic layer comprising a binder and a sufficient amount of magnetic particles dispersed within the binder to provide a magnetic signal through the traffic-bearing structure to a sensor. The article of the present invention is substantially inelastic.

The conformable magnetic articles of the invention preferably comprise a conformable magnetic layer containing permanently magnetizable particles such that the magnetic particles of the article can be oriented to produce a magnetic field that is detectable by a sensor mounted on a vehicle. Typical article width ranges from about 1 cm to 50 cm, preferably 5 to 20 cm, and typical article thickness ranges from about 0.1 cm to about 1 cm, preferably about 0.1 to 0.2 cm, although many other article shapes are possible such as a rope, a sheet, a perforated article, etc. The shape is dictated largely by the specific use of the article.

The inventive articles may be magnetized in a single pattern, but are preferably magnetized in a pattern to produce a readily-detectable alternating magnetic signal on the sensor. However, to convey more detailed information, the inventive articles may be magnetized ("encoded" or "written") in more complicated patterns, as found in bar codes, credit card strips, or magnetic tape recordings.

Another embodiment of the invention is a system for guiding vehicles or mobile objects traveling on a traffic-bearing structure, comprising:

a) at least one conformable magnetic article for underlaying beneath a traffic-bearing surface to send a magnetic signal to a sensor traveling over the traffic-bearing surface. The magnetic article comprises at least one conformable magnetic layer comprising a binder and a sufficient amount of magnetic particles dispersed within the binder to provide a magnetic signal through a traffic-bearing structure; and b) a sensor for passing over a traffic-bearing surface. The sensor comprises a means for detecting the magnetic signal through the traffic-bearing structure.

Another embodiment of the present invention is a system for guiding vehicles or mobile objectes traveling on a traffic-bearing structure, comprising:

(a) a traffic-bearing structure comprising at least two layers of material;

(b) a conformable magnetic article underlaid beneath the top surface of said traffic-bearing surface between two of said layers, said article adapted to send a magnetic signal to a sensor traveling over the traffic-bearing surface, said magnetic article comprising at least one conformable magnetic layer comprising a binder and a sufficient amount of magnetic particles dispersed within the binder to provide a magnetic signal through a traffic-bearing structure; and (c) a sensor for passing over the traffic-bearing surface, said sensor comprising means for detecting the magnetic signal through said traffic-bearing structure.

The output of the sensor unit(s) would optionally be a lateral offset signal. The output of the sensor may be used to control a vehicle and/or provide information to a driver via a display unit.

A method of providing a guidance system for a traffic-bearing structure is another aspect of the present invention.

One particularly useful application of the invention is in conjunction with the magnetic guidance of a snow plow. It is important for a snow plow to be properly located on the traffic-bearing structure, so that inadvertent damage to curbs, roadside signs, mailboxes, and the like can be avoided. Because lane markers can be obscured by snow or ice on a road, a snow plow driver would benefit from having a magnetic guidance system of the type described, such that the snow plow remains on the traffic-bearing surface. The present invention may be particularly beneficial for guiding snow plows in white-out (intense, blowing snow) conditions when visual guidance is limited.

Further, being underlaid, the articles of the present invention are less susceptible to damage from traffic or snow plows and less susceptible to vandalism.

Other useful applications include an electronic "rumble strip" that would provide warning to a driver that the vehicle was approaching the edge of a traffic-bearing structure, or a school zone, bridge deck, curve in the traffic-bearing structure, or obscure traffic-bearing structure entrance or exit, and as a component of an automated highway system in which vehicles are automatically guided in assigned lanes.

Further aspects and advantages of the invention will become apparent from the drawing figures, description of preferred embodiments, examples, and claims.

BRIEF DESCRIPTION OF THE DRAWING

These figures, which are idealized and not to scale, are intended to be merely illustrative and non-limiting.

DETAILED DESCRIPTION OF ILLUSTRATIVE EMBODIMENTS

The present invention provides for conformable magnetic articles underlaid beneath a roadway or other traffic bearing structure. Underlaid is defined herein as being completely surrounded by traffic-bearing structure material. Illustrative traffic-bearing structure materials include, but are not limited to, base layer materials, asphalt, gravel, concrete, cement, brick wood, dirt, and clay.

Figure 7:
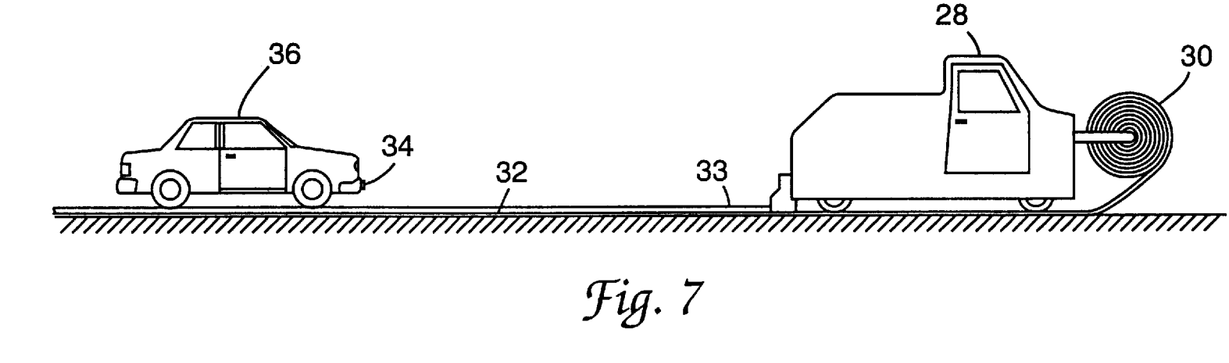
FIG. 7 is a schematic illustration of another embodiment of the present invention.

The general concept of the invention is illustrated in FIG. 7. In FIG. 7, a tape applicator 28 having pavement marling tape 30 of the invention applies a layer of the tape 32 to the traffic-bearing structure. Traffic-bearing structure material 33 is then laid over the pavement marking tape. The tape can then be detected by a sensor 34 on a vehicle 36 which drives over the traffic-bearing surface.

The conformable magnetic article comprises a layer having a permanently magnetizable material in an organic binder. This layer is characterized by a high degree of conformance to the surrounding traffic-bearing structure material and high ratio of viscous damping to elasticity. Such a layer promotes and contributes to enhanced adhesion of the inventive article to the surrounding surfaces. The conformability of the article helps accommodate for the mismatch of the thermodynamic and mechanical properties between the traffic-bearing structure and the article.

The conformable magnetic article of the present invention may be held in place by one or more optional fastening means. This optional fastening means, which may be a chemical adhesive (such as a pressure-sensitive, heat-sensitive adhesive, hot-melt thermoplastic, or contact adhesive) or a mechanical fastener (such as a nail, rivet, screw, staple, tack, etc.) enhances attachment of the article to the surrounding surfaces.

Figure 1:
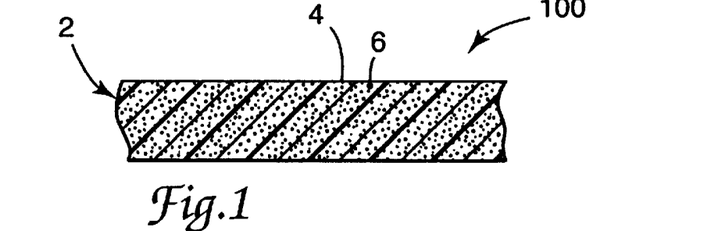
FIGS. 1, 2, 3, 4, and 5 are cross-sectional views (enlarged) of five different embodiments of conformable magnetic articles in accordance with the invention.

FIGS. 1–5 illustrate in cross-sectional views (enlarged) five non-limiting embodiments of conformable magnetic articles in accordance with the present invention. FIG. 1 illustrates conformable magnetic article 100, comprising a polymeric binder layer 4 having dispersed therein a plurality of magnetically orientable magnetic particles 6. The combination of organic binder 4 and magnetic particles 6 is referred to herein as magnetic layer 2.

Figure 2:
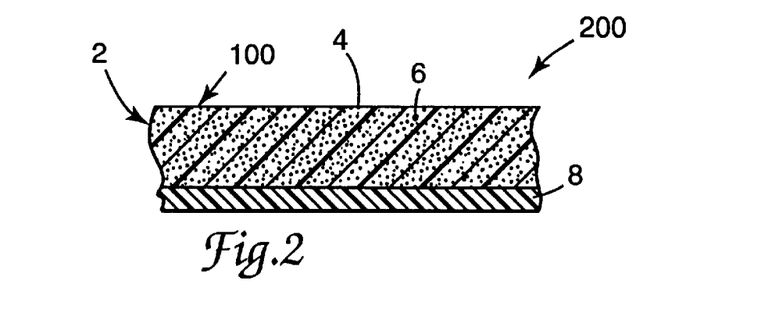

FIG. 2 represents the conformable magnetic article of FIG. 1 having an adhesive layer 8 with conformable magnetic article 200 having the same magnetic layer 2 as embodiment 100 in FIG. 1.

Figure 3:
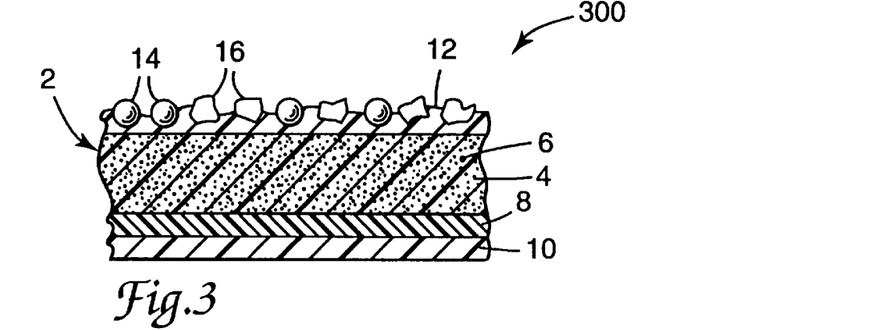
Figure 4:
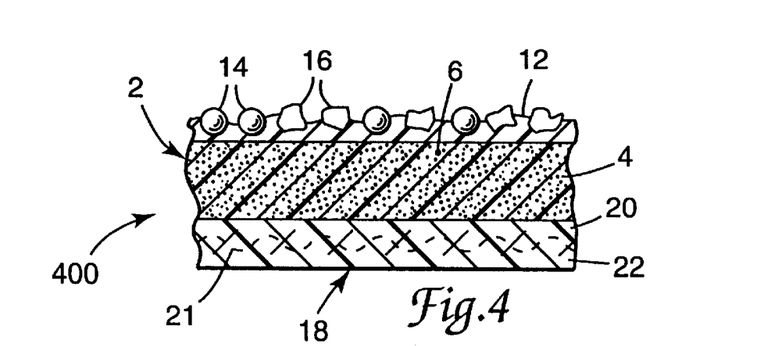
Figure 5:
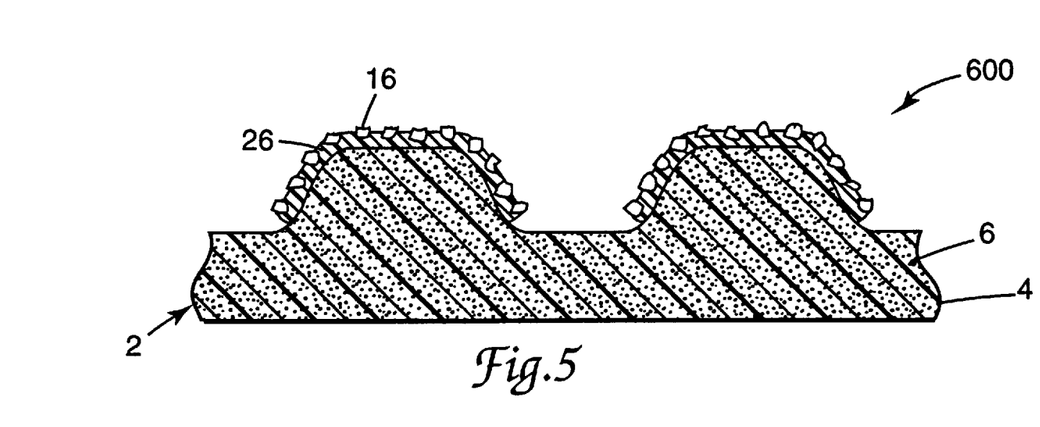

FIGS. 3, 4, and 5 represent pavement marking tapes having irregular surfaces (i.e., the tapes comprise skid-resistant particles, microspheres, or both). Use of these tapes may be beneficial because of ease of manufacturing or to enhance adhesion to the surrounding surfaces.

FIG. 3 represents an alternative magnetic pavement marking tape within the invention, again showing magnetic layer 2 comprising binder 4, magnetic particles 6, optional adhesive layer 8, and liner layer 10 temporarily adhered to adhesive layer 8. Embodiment 300 of FIG. 3 also illustrates a retroreflective and anti-skid layer comprised of a vinyl, epoxy, acidic olefin copolymer or polyurethane elastic support layer 12 which serves to adhere transparent microspheres 14 and irregularly shaped skid-resistant particles 16 to magnetic layer 2. These microsphere and skid-resistant particles may be placed on all sides of the article. In the illustrated embodiment 300, transparent microspheres 14 or other particles by providing a surface irregularity may prevent the article from sliding around within the traffic-bearing structure. Support layer 12 is less thick but generally less inelastic than magnetic layer 2. Thus, despite the inelastic deformable nature of the magnetic layer underlying the support layer and despite the very thin nature of the support layer, the support layer does not override the desired inelastic deformation properties of the magnetic layer that account for superior durability, and the support layer nevertheless supports the microspheres at the top of the article. In exemplary embodiments the thickness of magnetic layer 2 is at least about ¼ millimeter, more preferably at least about 1 millimeter, but preferably less than 3 millimeters.

When microspheres are pressed at normal room temperature into a sample of support layer 12 laid on a hard unyielding surface with a pressure that would embed microspheres into magnetic layer 2, the microspheres do not become embedded but remain on the surface of support layer 12 after the pressure has been released. In addition, support layer 12 has good adhesion to retroreflective elements or other particulate matter to be embedded in it, which assists in holding such particles against penetration into the magnetic layer, and possibly orienting magnetic particles 6 in an undesired direction. Vinyl-based polymers (polymers that include at least 50 weight percent polymerized vinyl monomer units) may be particularly useful materials for layer 12 because of their toughness and durability in a highway environment. Further, vinyl-based polymers tend to be abrasion resistant which may aid in securing the article within the traffic-bearing surface. Support layers based on vinyl polymers are typically plasticized to provide desired flexibility. Other support layer materials can be polyurethanes, acid containing olefin copolymers or other such materials known in the art.

FIG. 4 illustrates an enlarged cross-sectional view of embodiment 400 of a conformable magnetic pavement-marking tape in accordance with the present invention. Embodiment 400 is essentially identical to that of embodiment 300 of FIG. 3 except that the adhesive layer 18 comprises a woven or nonwoven fibrous web 21 embedded in and impregnated by the adhesive layer. A stratum 20 of the adhesive layer illustrated in FIG. 4 is disposed between magnetic layer 2 and fibrous web 21, and another stratum 22 of adhesive is disposed on the side of the web opposite from magnetic layer 2 forming the exterior bottom surface of the inventive tape, although there is no requirement that any adhesive be between web 21 and magnetic layer 2. A liner material (not illustrated) may be included on adhesive layer 18 opposite magnetic layer 2.

The fibrous web is preferably contained in the adhesive layer and is sufficiently porous and the fibers sufficiently separated so that the adhesive can saturate, i.e., surround individual fibers of the web. The fibrous web, if employed, may provide reinforcement or support for the conformance layer.

Tape embodiment 400, with the fibrous web present, has a tensile strength of at least 0.5 kilogram per centimeter width, and preferably at least 1 kilogram per centimeter width. Despite good tensile strength, the residual force exhibited by all articles of the invention should be low so as to allow it to remain in good conformity to the irregularities of the traffic-bearing structure layers. This residual force is typically described as creep recovery in penetration mode, as further explained herein.

Although the residual force properties just described characterize article embodiment 400, preferably the reinforcing web itself exhibits such properties independent of the other parts of article 400.

In preparing articles of the invention which include a fibrous web in an adhesive layer, the fibrous web is typically impregnated with a liquid version of the adhesive (100% solids or less) for example by passing the web through knife coater. Sufficient adhesive may be applied to the reinforcing web in this manner so that it may be adhered to a magnetic layer; or the magnetic layer may be covered with a layer of adhesive prior to application of the impregnated web, and added adhesive can be applied to form the bottom portion of the adhesive layer.

FIG. 5 illustrates an enlarged cross-sectional view of embodiment 600, which is an alternate magnetic marking embodiment of the invention. Skid particles are adhered only on the side surfaces and a portion of the top surface of the protuberances using an organic binder 26, such as a thermoplastic or thermosetting "particle-bond" material. One such binder is a vinyl-based thermoplastic resin including a pigment, as described in U.S. Pat. No. 4,117,192. Other suitable particle-bond materials include two-part polyurethanes formed by reacting polycaprolactone diols and triols with derivatives of hexamethylene diisocyanate; epoxy based resins described in U.S. Pat. Nos. 4,248,932; 3,436,359; and 3,580,887; blocked polyurethane compositions as described in U.S. Pat. No. 4,530,859; and polyurethane compositions comprised of a moisture-activated curing agent (e.g., an oxazolidine ring) and a polyisocyanate prepolymer. Magnetic particles 6 are present in layer 2 as in the other embodiments of the invention. The protuberances are generally at least about one millimeter in height, with about one millimeter spacing.

The conformable articles of the present invention may have non-conformable portions with or without magnetic particles.

Binder Materials

The articles of the invention have a plurality of magnetic particles in a binder which form a conformable magnetic layer. A sufficient amount of magnetic particles are present to provide a magnetic signal through the traffic-bearing structure to a sensor. Typically magnetic particles are non-spherical.

In some organic binder embodiments, for example when the organic binder comprises non-crosslinked elastomeric precursors (see for example U.S. Pat. No. 4,490,432), traditional rubber processing methods preferably are used to produce the conformable magnetic layer. Typically and preferably, compounding is performed in some type of heavy duty, batch or continuous, rubber kneading machine, such as a Banbury mixer or twin screw extruder.

The conformable magnetic layer may be formed by calendering between heavy rolls and then slitting to the desired width, directly by extrusion through a die, or by a combination of such methods. If the extruded material is semi-liquid as it leaves the die, the desired magnetic orientation of the magnetic particles may be produced by exposure to a permanent magnet or electromagnet at the exit of the die. Mechanical working, such as that which occurs during extrusion or calendering, and/or externally applied fields will promote orientation. Orientation enables one to obtain desired magnetic performance. Other methods of preparation and orientation will be apparent to one skilled in the art.

"Elastomer precursor" is used herein to describe a polymer which can be crosslinked, vulcanized, or cured to form an elastomer. An "elastomer" is a material that can be stretched, to at least about twice its original dimensions without rupture and upon release of the stretching force rapidly returns to substantially its original dimensions. Illustrative examples of useful elastomer precursors include acrylonitrile-butadiene polymers, neoprene, polyacrylates, natural rubber, and styrene-butadiene polymers. Extender resins, preferably halogenated polymers such as chlorinated paraffins, but also hydrocarbon resins, polystyrenes or polycyclodienes, are preferably included with the non-crosslinked elastomer precursor ingredients, and are miscible with, or form a single phase with, the elastomer precursor ingredients. The extender resins preferably account for at least 20 weight of the organic components in a conformable layer when using this binder.

Useful thermoplastic reinforcing polymers are known in the pavement marking art (e.g., polyolefins, vinyl copolymers, polyethers, polyacrylates, styrene-acrylonitrile copolymers, polyesters, polyurethanes and cellulose derivatives).

In other embodiments of the invention, the conformance layer has two primary components: a ductile thermoplastic polymer and a nonreinforcing magnetic mineral particulate. Preferably, the thermoplastic polymer is a polyolefin. These binders are described generally in U.S. Pat. No. 5,194,113.

Another embodiment of the present invention may utilize a conformability layer comprising microporous thermoplastic polymer.

Non-magnetic fillers and extenders may be used as desired.

Conformability Tests

The desired conformance properties of a material can be indicated by a penetration creep-recovery test (see generally U.S. Pat. No. 5,127,973). In this test, which is based on isothermal thermomechanical analysis, a probe is placed in contact with a sample of the material to be tested, a load placed on the probe, and penetration of the probe into the sample monitored. After a time, the load is removed from the probe and the probe position monitored as the sample is allowed to recover. Testing is typically carried out in a helium atmosphere using a thermomechanical analyzer module controlled by a temperature programmer, such as a Perkin Elmer TMS-1 thermomechanical analyzer controlled by a Perkin Elmer DSC-2 temperature programmer. The flat-point penetration probe assembly is used, with the probe tip diameter specified (typically 1 millimeter with the Perkin Elmer equipment).

Samples of the materials to be tested have a thickness of approximately 0.8 millimeter and an area of approximately 3-millimeter-by-3-millimeter. The sample is transferred to a small aluminum pan and placed on the sample platform of the thermomechanical analyzer.

A load of one gram is placed on the probe and the probe released and allowed to fall onto the sample. After about 3 to 5 seconds of contact with the sample, the one gram load is removed and the sample allowed to relax. This results in the probe tip resting on the sample in a zero-loading condition. The temperature control chamber of the thermomechanical analyzer is raised to surround the sample platform and bring the sample to thermal equilibrium at the desired temperature of the test (generally about room temperature or up to 30° C.). The sample is allowed to equilibrate at the test temperature for approximately five minutes with the probe still in contact with the sample surface in a zero-loading condition.

Data acquisition of the probe position is then begun with the probe still under a load of zero to establish the zero-load baseline. After a short time, approximately 20 seconds, a mass of 20 grams is placed on the probe and the probe deflection monitored as it penetrates into the sample. The load is allowed to remain on the sample for two minutes, after which the 20-gram mass is removed from the probe to again attain a zero-load condition for the recovery step of the test. Sample recovery is monitored for at least two more minutes. The amount of penetration two minutes after the load was applied and the percentage of recovery two minutes after the load is removed are measured from creep-recovery data traces obtained in the experiment.

When performing the above test, a probe having a diameter of 1 millimeter generally penetrates at least 0.05 millimeter, and preferably penetrates at least 0.08 millimeter into useful conformance layers. The top layer in some embodiments of the invention undergoes a penetration of less than 0.05 millimeter in the described test.

To minimize the elastic recovery which would loosen sheet material from the surrounding surfaces of the traffic-bearing surface, the conformable layer should recover after removal of the load no more than 65 percent of the distance to which the probe has penetrated, and preferably no more than 50 percent of the penetrated distance.

Consistent with the properties of conformability discussed above, the conformable layer is preferably a stretchable or flowable material. For example, the conformable layer is preferably capable of being stretched at least 50 percent before break at a strain rate of 0.05 second$^{-1}$ for a 1 cm wide sample.

Another test which may be used to indicate conformability is inelastic deformation. For example, articles having a layer characterized by exhibiting, when tested using standard tensile strength testing apparatus, at least 25% inelastic deformation (ID) after being stretched once to 115% of the original sample length have sufficient conformance. In a broader sense, one may use a layer characterized by at least 25% (ID) after being stretched to 115% of its original length in sheet construction, although the whole article may exhibit less ID. See for example U.S. Pat. No. 5,082,715.

Inelastic deformation may be tested using the following method. A test strip (standard strip size for tensile strength testing) is pulled in a tensile strength apparatus (at, for example, a rate of 300%/minute), until it has stretched some predetermined amount, e.g., 15%. The deformation is reversed, causing a decrease in tensile stress to zero. On repeated tensile deformation, no force is observed until the sample is again taut. The strain at which force is first observed on a second pull is a measure of how much of the first deformation was permanent. This strain divided by the first (e.g., 15%) deformation is defined as the inelastic deformation (ID). A perfectly elastic material or rubber would have a 0% ID. Conformable materials useful in the present invention combine low stress of deformation and ID greater than 25%, preferably greater than 35%, more preferably greater than 50%.

As a more simple test, and with experience, one skilled in the pavement marking art can generally determine if a particular sample of a conformance layer material will exhibit the desired creep recovery and inelasticity characteristics by simply handling the sample and probing it with a finger. Such "hand" characteristics are often employed in day-to-day testing.

Magnetic Particles

The most likely choice of magnetic material is a composite of particles of a permanent magnetic material dispersed in a matrix of an organic binder. Many types of magnetic particles capable of being remanently magnetized are known to those familiar with the magnetic materials art.

The major axis length of such particles (defined as the maximum length in any direction) suitable for use in this invention ranges from about 1 millimeter down to about 10 nanometers. The preferred range is from about 200 micrometers down to about 0.1 micrometer. The saturation magnetization of the magnetic particles can range from about 10 to about 250 emu/g (electromagnetic units/gram), and is preferably greater than 50 emu/g. The coercivity of such particles can range from about 100 to about 20,000 oersteds, more preferably ranging from about 200 to about 5000 oersteds. Particles with coercivities less than about 200 oersteds are too easily accidentally demagnetized, while particles with coercivities greater than 5000 oersteds require relatively expensive equipment to magnetize fully.

The article of the present invention may comprise sections of alternating polarity along the length of the article.

One class of high-performance permanent magnet particles are the rare earth-metal alloy type materials. Examples of the incorporation of such particles into a polymeric binder include U.S. Pat. No. 4,497,722, which describes the use of samarium-cobalt alloy particles, and European Patent Application No. 260,870, which describes the use of neodymium-iron-boron alloy particles. Such particles are not the most preferred for this application, because the alloys are relatively costly; the alloys may experience excessive corrosion under conditions of prolonged outdoor exposure; and the coercivity of such alloys is typically greater than 5000 oersteds.

Many other types of metal or metal-alloy permanent magnet particles could be used, but are not the most preferred. They include Alnico (aluminum-nickel-cobalt-iron alloy), iron, iron-carbon, iron-cobalt, iron-cobalt-chromium, iron-cobalt-molybdenum, iron-cobalt-vanadium, copper-nickel-iron, manganese-bismuth, manganese-aluminum, and cobalt-platinum alloys.

The most preferred magnetic materials are of the class of stable magnetic oxide materials known as the magnetic ferrites. One particularly preferred material is the hexagonal phase of the magnetoplumbite structure commonly known as barium hexaferrite, which is generally produced as flat hexagonal platelets. Strontium and lead can substitute in part or completely for the barium, and many other elements can partially substitute for the iron. Thus strontium hexaferrite is also a preferred material. Another class of preferred materials is the cubic ferrites, which are sometimes produced as cubic particles, but more often as elongated needle-like, or acicular, particles. Examples include magnetite ($Fe_3O_4$), magnemite or gamma ferric oxide (gamma-$Fe_2O_3$), intermediates of these two compounds, and cobalt-substituted modifications of the two compounds or of their intermediates. All of these magnetic ferrites are produced in large quantities at relatively low cost and are stable under conditions of prolonged outdoor exposure. Their coercivities fall in the most preferred range of 200 to 5000 oersteds.

Chromium dioxide is another alternate material which may be useful as a magnetic particle in the invention due to its low Curie temperature, which facilitates thermoremanent magnetization methods.

The magnetic particles are generally dispersed in the polymeric matrix at a high loading. The magnetic particles constitute at least 1 volume percent of the magnetic layer, while it is difficult to include particles in an amount constituting more than about 75 volume percent of the material. Preferably, the conformable magnetic article has a binder comprising at least 30 volume percent of magnetic particles. A preferred loading range would be about 30 to 60 volume percent, more preferably from about 45 to about 55 volume percent. To obtain the highest remanent magnetization, the particles preferably are substantially domain-size, anisotropic particles, and there preferably is substantially parallel alignment of preferred magnetic axes of a sufficient number of the particles so as to make the magnet material itself anisotropic.

Ferrites, especially barium, lead, and strontium ferrites, generally in a roughly plate-like form having preferred magnetic axes perpendicular to the general planes of the plates, are preferred as the particulate materials. However, other materials having permanent magnetic properties, such as iron oxide particles or such as particles of manganese-bismuth or iron protected against oxidation, can also be used.

As is known in the art and referred to above, the orientation of the magnetic particles may be optimized by physically orienting (e.g. calendering) the particles.

For an exemplary magnetic article having a width of approximately 10 cm, and an average magnetic thickness layer of about 0.1 cm, the magnetic field is about 10 gauss at the surface of the article, 5 gauss at a distance of about 5 cm, 2 gauss at a distance of about 10 cm, and 1 gauss at a distance of about 15 cm. Thus, if the tape were underlaid about 10 cm beneath a traffic-bearing surface, the magnetic field strength at the traffic-bearing surface would be approximately 2 gauss, which is believed to be sufficient to be detected by a sensor. Of course, stronger or weaker magnetic fields may also be produced by the magnetic article, depending on the materials and processes used to make the article.

The magnetic article may also be provided with protuberances or other topographical features that aid in preventing the article from shifting within the traffic-bearing structure after it has been underlaid. In yet another embodiment of an underlaid magnetic article, the article includes a longitudinally extending tape or strip, in which a multitude of perforations have been formed along the length of the tape. The perforations could allow flow of the traffic-bearing structure material through the strip, providing even greater mechanical anchorage within the traffic-bearing structure itself. In this way, the possibility of flexure and cracking in the traffic-bearing structure may be reduced.

Installation Methods

The magnetic articles of the present invention may be underlaid beneath an existing traffic-bearing surface or within a new traffic-bearing surface.

The conformability feature of the inventive magnetic article is particularly useful when the article is retrofitted to a traffic-bearing structure. In such applications, a portion of an existing traffic-bearing structure is typically ground or cut away, and the debris removed. The exposed section of the traffic-bearing structure often is not smooth, and thus the conformability of the magnetic article of the present invention enables the article to bond more securely to the bottom surface of the exposed section. The exposed section may then be potted, or filled, with a patching material, and the magnetic article is thus underlaid beneath the traffic-bearing surface. Inelasticity is an important feature because traffic-bearing structure, and particularly asphalt cement concrete (commonly known as blacktop, or asphalt), transmit forces applied by vehicles to any object embedded in the traffic-bearing structure. If an embedded article is elastic relative to the traffic-bearing structure material, the traffic-bearing structure may flex and bounce back toward an applied force, and ultimately crack or break apart, which is manifestly undesirable. Thus, an irreversibly deformable magnetic article is desirable in the context of this and other embodiments.

A preferred method of underlaying the article, however, is in conjunction with new traffic-bearing structure construction. Traffic-bearing structures are typically constructed by laying several courses or layers of materials atop each other. For example, a typical asphalt road construction typically includes a crushed rock undercourse on top of which three or four layers of various grades of asphalt may be applied. The asphalt layers may be on the order of about 2 to 20 cm thick, and thus the finished traffic-bearing structure is a composite, or laminate, comprising the various layers. In the preferred embodiment of the method of underlaying a magnetic article beneath a traffic-bearing structure, the magnetic article is applied in a continuous strip in a desired location on the penultimate layer of the traffic-bearing structure, such that the final layer of the traffic-bearing surface covers both the penultimate layer and the magnetic article. Thus, the magnetic article is underlaid beneath the traffic-bearing surface and protected from vehicular traffic, and yet is sufficiently close to the finished surface of the traffic-bearing surface to permit detection of the magnetic signals by a sensor mounted on a vehicle. Although it is preferred to underlay the magnetic article beneath only one layer of a multi-layer traffic-bearing structure, the article may be underlaid at any depth within the traffic-bearing structure, under any number of layers of the traffic-bearing structure, subject only to the ability of a sensor to receive a magnetic signal from the article.

The magnetic article may also be underlaid beneath a traffic-bearing surface by providing a base (herein defined as any components the traffic-bearing structure below the traffic-bearing surface layer) for the traffic-bearing structure, positioning the article at a location on or above a portion of the base, and then applying a paving material such as Portland cement concrete (commonly known as concrete) over the article and the base. Thus, the article is suspended within the traffic-bearing structure, rather than lying completely under it, although the latter is also possible. The magnetic article may also underlie a gravel road, either by plowing a trench in an existing gravel road and placing the article under the finished surface of the traffic-bearing structure, or by installing the article on the undercourse of a new gravel road prior to the application of the final layer(s) of that traffic-bearing structure.

In another embodiment, paver bricks may be used as the traffic-bearing structure material and be laid over the prepared baselayer.

The continuous magnetic article of the present invention may be applied to the traffic-bearing structure either manually, or by a machine. The machine may travel ahead of a paving machine, or may be mounted at the leading end of the paving machine, such that the continuous magnetic article is applied to the traffic-bearing structure at some time prior to the application of the final layer or layers of the traffic-bearing structure.

The magnetic articles of the present invention may be installed as part of a traffic-bearing structure using any one of a variety of apparatus, such as human pushable dispensers, "behind a truck" types of dispensers, and "built into a truck" types of dispensers. For example, U.S. Pat. No. 4,030,958 discloses a suitable behind a truck type dispenser for applying the articles of the invention in the form of adhesive-backed tapes to a surface and U.S. Pat. No. 4,623,280 discloses a manual-tape applicator.

Following application of the conformable magnetic article to the desired surface, a further layer of the traffic-bearing structure material is applied to underlay the article beneath the top surface of the traffic-bearing structure.

The conformable magnetic articles of the present invention may be underlaid at various depths.

Other means may be used to install the articles of the invention, such as simple manual application or the previously mentioned mechanical fasteners.

Guidance Systems

Figure 6:
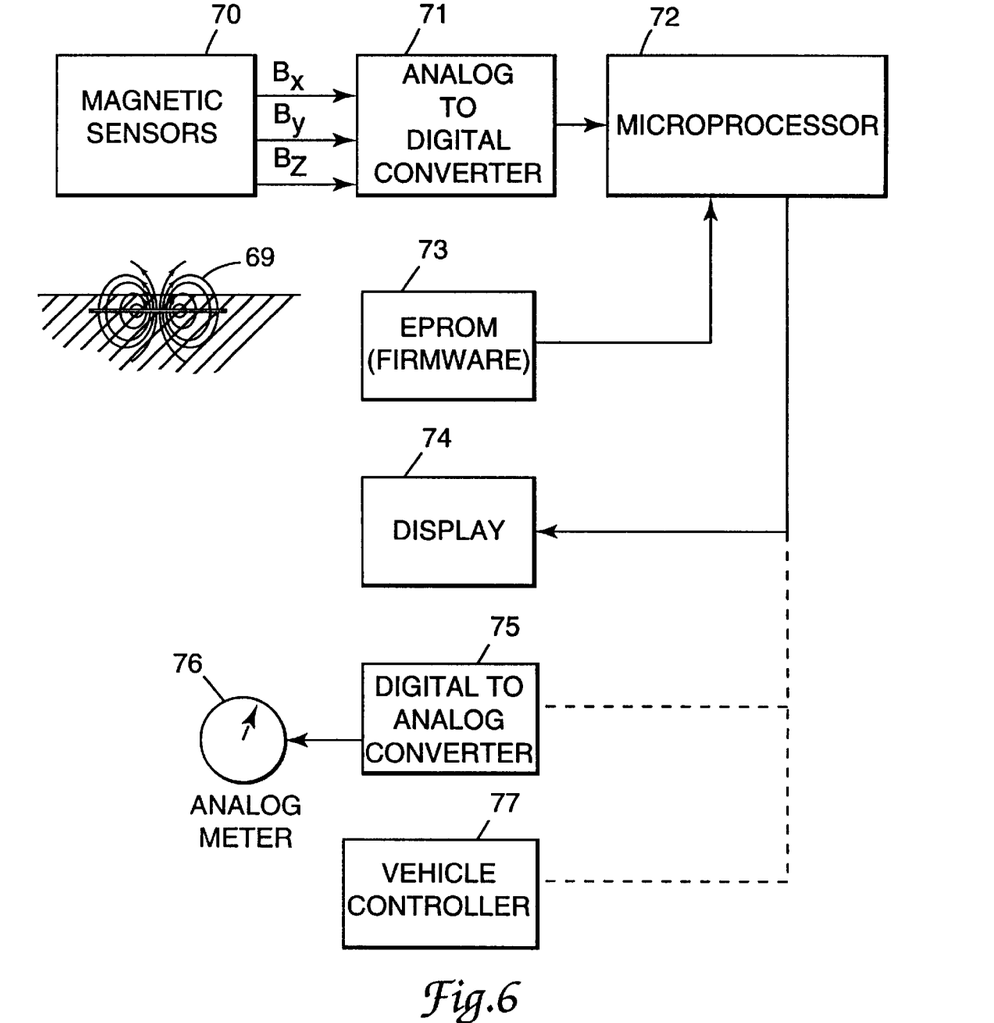
FIG. 6 is a schematic diagram of an inventive control and/or guidance system in accordance with the invention.

The invention also provides a system for guiding vehicles or mobile objects traveling on a roadway, through a warehouse, and the like. The primary components of the systems of the invention are the conformable magnetic articles underlaid beneath a traffic-bearing surface of the invention, and a system to detect the magnetic field from the article. A typical sensor system includes a sensor device and a guidance device. A typical lateral position indicator system of the invention suitable for use in guiding a human operated vehicle is illustrated in FIG. 6.

The inventive magnetic article also is unpowered, meaning that it does not require an outside power source either to send or receive a signal. In this regard, the present invention is distinguishable from powered embedded articles such as those that are typically used to determine whether a vehicle on a roadway is stopped at an intersection, such as at a red light. Embedded sensors of this type are further distinguishable from the present invention in that the former requires electrical power, whereas the latter is an unpowered magnetic field source. The unpowered magnetic article of the present invention also requires less installation time and less maintenance, costs nothing to operate, and may be used in remote locations where a power supply is not readily available. Thus, the unpowered magnetic article of this invention provides several advantages over conventional embedded powered articles.

Sensors

A number of sensors and transducers are available to convert the magnetic signal from the articles of the invention into an electrical signal suitable for further processing. Illustrative examples of such sensors include flux-gate magnetometers, Hall effect sensors, and solid-state magnetoresistive (MR) sensors.

A potential problem exists in distinguishing the guidance signal from magnetic "noise" produced by steel reinforcing bars, other vehicles, and the like. If the inventive article is magnetized in a regular alternating pattern or in some "unique" pattern, the magnetic signal will then be periodic with a frequency proportional to the vehicle's speed. Modern signal processing techniques can then be used to extract the signal at a known frequency from the noise.

The sensor is mounted in a position suitable for measuring the fields produced by the underlaid tape of the present invention.

Magnetic sensors attached to the vehicle may determine the field in one, two, or all three directions. The signal from one sensor or a mathematical combination of two or three field components may be used to compute a signal that can be related to lateral distance of a vehicle from the inventive articles.

By magnetizing the strip in a more complicated pattern, additional information can be encoded. For example, information about the direction and radius of an upcoming curve in the road or about the slope of an approaching upgrade or downgrade could be used for feed-forward control of the lateral position and speed of the vehicle. As part of a vehicle navigation system, location codes could be given.

Indicating Means

Illustrative examples of indicating means include at least one horn, gauge, whistle, electrical stimulation, LCD, CRT, light, combination of these, and the like. One or more indicating means may be desired in a particular situation.

Guidance Means

An electronic control means may be used as a guidance means in the present invention.

EXAMPLES

The articles and systems of the invention are further explained with relation to the following examples, wherein all parts and percentages are by weight, unless otherwise specified.

Table of Components
The following materials were used in the examples.

| Component | Description | Available From |
| --- | --- | --- |
| Paracril ™ B | medium acrylonitrile content nitrile rubber | Uniroyal Chemical Co., Akron, Ohio |
| Chlorez ™ 700S | solid chlorinated paraffin | Dover Chemical Corp., Dover, Ohio |
| Paroil 140 LV | a liquid chlorinated paraffin | Dover Chemical Corp., Dover, Ohio |
| Stearic Acid | process aid | Humko Chemical Division of Witco Chemical Corp., Memphis, Tennessee |
| Vanstay ™ SC | "chelating agent" type stabilizer | R.T. Vanderbilt Company, Inc., Norwalk, Connecticut |
| Santowhite ™ Crystals | antioxidant | Monsanto Chemical Co., St. Louis, Missouri |
| PE Minifiber 13038F | high density polyethylene fiber | Mini Fibers, Inc., Johnson City, Tennessee |
| PET 6-3025 fibers | ¼" × 3d. polyester fiber | Mini Fibers, Inc., Johnson City, Tennessee |
| Barium hexa-ferrite P-235 | magnetic pigment | Arnold Engineering Co., Norfolk, Nebraska |
| Methyl iso-butyl ketone | solvent | Eastman Chemical Co., Kingsport, TN |
| Zinc 2-ethyl-hexanoate | (Hexogen Zinc Octoate) catalyst | AKZO Chemie America, New Brunswick, NJ |
| Stan-Tone ™ 10 EPX03 | white pigment dispersion in diglycidyl ether of bisphenol A epoxy resin | Harwick Chemical Corp., Akron, OH |
| Stan-Tone ™ 25 EPX01 | red pigment dispersion in diglycidyl ether of bisphenol A epoxy resin | Harwick Chemical Corp., Akron, OH |
| Stan-Tone ™ 90 EPX04 | black pigment dispersion in diglycidyl ether of bisphenol A epoxy resin | Harwick Chemical Corp., Akron, OH |

Example 1

A conformable magnetic article of the invention was made by compounding the following in a Banbury-type internal mixer to thoroughly mix the ingredients.

| Material | Spec. Grav. | Parts |
| --- | --- | --- |
| Paracril B | 0.98 | 100.0 |
| Chlorez 700S | 1.66 | 70.0 |
| Paroil 140 LV | 1.16 | 5.0 |

-continued

| Material | Spec. Grav. | Parts |
| --- | --- | --- |
| Stearic Acid | 0.84 | 0.5 |
| Vanstay SC | 0.89 | 0.5 |
| Santowhite Crystals | 1.07 | 1.0 |
| PE Minifiber | 0.94 | 20.0 |
| PET fiber | 1.38 | 10.0 |
| Barium hexaferrite P-235 | 5.3 | 950.0 |
| Total Weight | | 1157 |

When the temperature of the mix reached 146° C. the mix was dropped from the mixer onto a two roll rubber mill. The material was sheeted off the rubber mill and fed through a two-roll calender to yield a sheet of material having a thickness of approximately 1.4 mm.

The sheet of material was embossed according to the process described in U.S. Pat. No. 5,227,221 (col. 2, lines 47–65) to provide a conformable magnetic sheet having a plurality of protrusions projecting from one of its major surfaces. The embossed sheet had a thickness of about 0.5 mm in the valleys between the protrusions, and a thickness of about 1.6 mm at the protrusions. A discontinuous layer of liquid particle bond material was applied to the top and sides of the protrusions of the embossed sheet using the process described in U.S. Pat. No. 5,227,221. The particle bond material was the same as the polyurethane bead bond of U.S. Pat. No. 5,227,221 (col. 4, lines 20–39), with the exception that the pigment dispersion was made with the following composition:

| Particle Bond Pigment Dispersion | |
| --- | --- |
| Ingredient | % (by weight) |
| methyl isobutyl ketone | 7.04 |
| zinc 2-ethylhexanoate | 3.52 |
| Stan-Tone 10 EPX03 | 41.55 |
| Stan-Tone 25 EPX01 | 3.52 |
| Stan-Tone 90 EPX04 | 44.37 |

The surface of the particle bond material coated protrusions was sprinkled with durable black spheroidal anti-skid particles of the type available from Carbo Ceramics of New Iberia, La., under the designations CARBOLITE and CARBOPROP. The particles were applied so as to partially embed them in the liquid particle bond material. The liquid particle bond material was solidified as described in U.S. Pat. No. 5,227,221 by passing the sheet through an oven at a temperature of about 175° C. for approximately 10 minutes of residence time.

A layer of rubber resin pressure sensitive adhesive with a thickness of about 125 micrometers was laminated to the bottom side of the sheet. The sheet had a hand characteristic of conformable pavement marking tapes and quite similar to those of STAMARK™380 Series pavement marking tape and STAMARK™385 Series Non-Reflective Joint Cover Tape available from Minnesota Mining and Manufacturing Co. (3M) of St. Paul, Minn. The sheet was visually similar to STAMARK™385 except that the non-particle coated regions between the projections were dark purplish-brown in color instead of black.

Example 2

This sample was prepared as disclosed in Example 1, except that the coating of a particle bond material and anti-skid particles were omitted. The sample had a hand characteristic similar to Example 1. The sample was suitable for being underlaid beneath a layer of paving material.

Example 3

This example was prepared in the same manner as was Example 2, except that the calendered sheet material was not embossed. The sample had a hand characteristic similar to conformable sheet materials disclosed in U.S. Pat. No. 4,490,432. The sample was suitable for being underlaid beneath a layer of paving material.

Example 4

The sheet material of Example 1 was magnetized by passing the sheet between the magnetic poles of a permanent magnet assembly. The magnetizing field was about 10,000 gauss (1 tesla), and the resulting permanent magnetization of the sheet material was about 120 electromagnetic units per cubic centimeter (120 kilo-amperes per meter).

Example 5

The sheet material of Example 1 was magnetized by passing a web of the sheet between the magnetic poles of an electromagnet assembly. The magnetizing field was about 10,000 gauss (1 tesla). The resulting permanent magnetization of the sheet material was about 120 electromagnetic units per cubic centimeter (120 kilo-amperes per meter). A length encoder measured the length of web passing between the poles of the electromagnet. After a fixed length of tape web, typically between 0.9 and 3.0 meters, had passed between the poles, the direction of current flow was automatically reversed, thus reversing the direction of magnetization of the tape.

The magnetic field of the sheet of this Example was measured near the top surface of the sheet as shown in the following Table.

| Distance above sheet (cm) | Magnetic field strength (gauss) |
| --- | --- |
| 0 (surface measurement) | 10 |
| 5 | 5 |
| 10 | 2 |
| 15 | 1 |

Example 6

A magnetic sheet material could be made following the steps used to produce the article of Example 1, with the additional step of punching an array of holes completely through the sheet. The holes should be large enough, preferably on the order of 5 mm or more, or more preferably 8 mm or more, in diameter so as to allow flow of roadway paving material through the sheet to contact and bond with the underlying roadway base. The article could be magnetized following processes such as those used in Examples 4 and 5.

Example 7

A layer of asphalt paving compound was applied to the gravel undercourse of a roadbed and tamped. A roll of sheet material prepared in accordance with Example 6 was applied to the top surface of the layer of asphalt while the asphalt was still hot (about 65° to 95° C. and tamped into place by having a person walk on the sheet. The sheet measured 10.2 cm in width and 55 m in length. The sheet had a magnetization pattern of alternating north and south poles directed upward with a field direction change every 2.13 m. A layer of asphalt concrete cement paving material was paved over the magnetic strip and underlying base to yield an underlaid conformable magnetic article of the invention. The layer of asphalt was about 4 cm thick, and the temperature of the applied material was about 120° C.

The magnetic field emanating from the strip was detectable through the layer of asphalt by means of a simple compass or pivoted bar magnet, as well as by various types of magnetometers. The net magnetic field strength, corrected for the earth's field, above the centerline of the strip was 6 gauss (600 microtesla), as determined with a Model 4048 hand-held digital gauss/tesla meter, available from F. W. Bell, Inc. of Orlando, Fla.

Example 8

The magnetic strip of Example 7 was installed beneath pavement with a longitudinal orientation of the strip running in a generally east/west direction and north/south direction. The magnetic field of the underlaid magnetic strip was measured at a height of 30.5 cm above the pavement surface at a range of lateral distances of from 4 cm to 1.2 m while traveling along the length of the underlaid strip. The speed of travel was approximately 1.07 m/s in the easterly direction. The ambient air temperature was approximately 24° C. and the pavement surface temperature was approximately 35° C.

Figure 8:
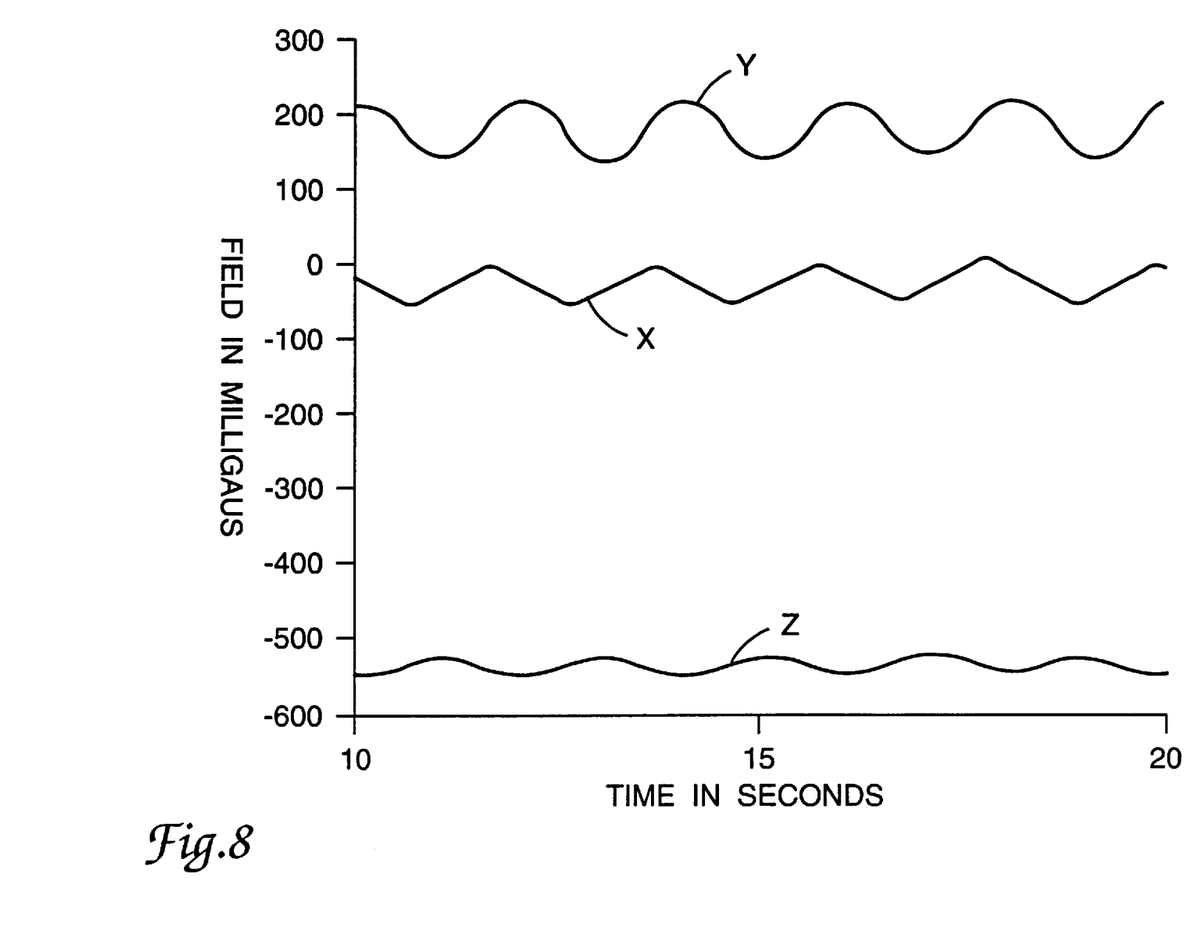
FIG. 8 is a graph showing representative data in connection with the embodiment of FIG. 7.

A graph of representative data from measurements made in each of the X, Y, and Z directions while traveling at a lateral distance of 0.6 m south of the strip is shown in FIG. 8. The X direction is the direction of travel (east). The Y direction is transverse to the strip (north). The Z direction is vertical elevation (upward).

Amplitudes of magnetic field strength were estimated from the data for each of several runs at lateral distances of from 4 cm to 1.2 m by measuring the peak to peak amplitude of the waveform and dividing by two to account for pole reversal for each direction X, Y, and Z for measurement runs made at each distance. The data are shown in the following table.

| | Lateral Distance from Center of Strip | | | |
|---|---|---|---|---|
| Magnetic Field Strength | 0.04 m | 0.6 m | 0.9 m | 1.2 m |
| X direction | 180 milligauss | 27 milligauss | 11 milligauss | 4.5 milligauss |
| Y direction | 50 milligauss | 38 milligauss | 14 milligauss | 6 milligauss |
| Z direction | 215 milligauss | 12 milligauss | 9 milligauss | 6.5 milligauss |

Other magnetic field strength readings were taken using a gauss meter over the period of one year. Results as well as visual observations are set forth below.

Aug. 17, 1995

Readings were taken using a F. W. Bell gauss meter model 4048 before the final 4 cm topcoat of asphalt was laid. The readings were taken about 2.5 cm above the surface, centered over the tape, away from the field transitions, and normal to the tape or perpendicular to the field. The surface temperature was about 95° C. The average reading was 7 gauss (±10 percent).

Aug. 18, 1995

After laying the final topcoat, readings were taken about 2.5 cm above the pavement surface. The surface temperature was about 20° C. Readings were taken from both the east-west and the north-south strips. The average reading was 3.2 gauss (±10 percent). Visual observations: nothing out of the ordinary.

Aug. 30, 1995

The surface temperature was about 20° C. Readings were taken from both the east-west and the north-south strips. The average reading was 3.8 gauss. Visual observations: no noticeable defects in the surface where the tape was underlaid.

Sep. 16, 1996

The surface temperature was about 20° C. Readings were taken from both the east-west and the north-south strips. The average reading was 3.8 gauss. Visual observations: cracked asphalt, but not along the surface where the tape was underlaid; in one instance, the asphalt cracked perpendicular to the direction in which the tape was underlaid beneath the surface.

Example 9

The sheet material of Example 4 was underlaid within a traffic-bearing surface of a road in June 1996. The tape was laid over the 3rd layer of asphalt (surface temperature 111° F. (44° C.)) using a MHTA-1 Manual Highway Tape Applicator available from 3M. Then, three single passes were made with a RTC-2 Roller-Tamper Cart with a 200 lb. (90.8 kg) weight (available from 3M) to tamp the tape into place. Then a tack layer of oil was applied and allowed to "dry". Then a final layer of asphalt (about 4 cm thick) was placed over the tape.

Each tape was 0.75 miles (1.2 km). A reading was taken using a gauss meter at approximately 2.5 cm above the top layer of asphalt and measured 2.9 gauss at a surface temperature of about 95° C.

Approximately three months later, no damage to the road was apparent.

Various modifications and alterations will become apparent to those skilled in the art without departing from the scope and spirit of this invention, and it should be understood that this invention is not to be unduly limited to the illustrative embodiments set forth herein.

What is claimed is:

1. A conformable magnetic article for underlayment beneath a traffic-bearing surface to send a magnetic signal to a sensor traveling over the traffic-bearing surface, said magnetic article comprising at least one conformable magnetic layer comprising a binder and a sufficient amount of magnetic particles within the binder to provide the magnetic signal, the conformable layer being sufficiently conformable to meet the inelastic deformation test, wherein said article is perforated along its length.

2. The magnetic article of claim 1, wherein said article is substantially inelastic.

3. The magnetic article of claim 1, wherein said article comprises sections of alternating polarity along the length of the article.

4. The magnetic article of claim 1, wherein said magnetic article further comprises a layer of pressure-sensitive adhesive applied to a major surface of the article.

5. A system for guiding vehicles or mobile objects traveling on a traffic-bearing surface, comprising:

(a) at least one conformable magnetic article for underlaying beneath a traffic-bearing surface to send a magnetic signal to a sensor traveling over the traffic-bearing surface, said magnetic article comprising at least one conformable magnetic layer comprising a binder and a sufficient amount of magnetic particles within the binder to provide the magnetic signal, the conformable layer being sufficiently conformable to meet the inelastic deformation test; and (b) a sensor for passing over the traffic-bearing surface, said sensor comprising means for detecting the magnetic signal through the traffic-bearing surface, wherein said magnetic article is perforated along its length.

6. The system of claim 5, wherein said magnetic article is substantially inelastic.

7. The system of claim 5, wherein said magnetic article comprises sections of alternating polarity along its length.

8. The system of claim 5, wherein said sensor is mounted on a vehicle adapted to travel over the traffic-bearing surface.

9. The method of claim 5, wherein said magnetic article further comprises a layer of pressure sensitive adhesive applied to a major surface of the article.

10. A system for guiding vehicles or mobile objects traveling on a traffic-bearing surface, comprising:

(a) a traffic-bearing surface comprising at least two layers of material;

(b) a conformable magnetic article underlaid beneath the top surface of said traffic-bearing surface between two of said layers, said article adapted to send a magnetic signal to a sensor traveling over the traffic-bearing surface, said magnetic article comprising at least one conformable magnetic layer comprising a binder and a sufficient amount of magnetic particles within the binder to provide the magnetic signal, the conformable layer being sufficiently conformable to meet the inelastic deformation test; and (c) a sensor for passing over the traffic-bearing surface, said sensor comprising means for detecting the magnetic signal through said traffic-bearing surface.

11. The system of claim 10, wherein said magnetic article is substantially inelastic.

12. The system of claim 10, wherein said magnetic article is perforated along its length.

13. The system of claim 10, wherein said magnetic article comprises sections of alternating polarity along its length.

14. The system of claim 10, wherein said sensor is mounted on a vehicle adapted to travel over said traffic-bearing surface.

15. The system of claim 10, wherein said traffic-bearing surface comprises asphalt, and wherein said two layers are the outermost two layers of said traffic-bearing surface.

16. The system of claim 10, wherein said magnetic article further comprises a layer of pressure sensitive adhesive applied to a major surface of the article.

* * * * *